United States Patent [19]

Pech

[11] Patent Number: 5,018,978

[45] Date of Patent: May 28, 1991

[54] DEVICE FOR THE PRESENTATION OF OBJECTS

[76] Inventor: Rudiger Pech, Schwanhildenstrasse 1, D-8052 Wang, Fed. Rep. of Germany

[21] Appl. No.: 331,658

[22] PCT Filed: Jun. 27, 1988

[86] PCT No.: PCT/DE88/00381

§ 371 Date: Apr. 24, 1989

§ 102(e) Date: Apr. 24, 1989

[87] PCT Pub. No.: WO88/10485

PCT Pub. Date: Dec. 29, 1988

[30] Foreign Application Priority Data

Jun. 25, 1987 [DE] Fed. Rep. of Germany ... 8708837[U]

[51] Int. Cl.[5] .............................................. G09B 25/00

[52] U.S. Cl. .................................................. 434/376

[58] Field of Search ...................... 434/78, 79, 80, 333, 434/365, 373, 374, 375, 72, 75, 368, 370, 376, 405, 427, 209, 199, 94, 395

[56] References Cited

U.S. PATENT DOCUMENTS

| | | | |
|---|---|---|---|
| 535,551 | 3/1895 | Palladino | 434/395 |
| 1,246,076 | 4/1917 | Fairbanks | 434/79 |
| 1,453,833 | 5/1923 | Fleming et al. | 434/368 |
| 2,071,338 | 2/1937 | Henze et al. | 434/94 |
| 2,300,360 | 10/1942 | Remmers | 434/79 |
| 2,481,672 | 9/1949 | Kanaske | 434/79 |
| 3,432,943 | 3/1969 | Merkel | 434/199 |
| 3,559,306 | 10/1971 | Winans | 434/79 |
| 4,830,619 | 5/1989 | Marion | 434/78 |

FOREIGN PATENT DOCUMENTS

| | | | |
|---|---|---|---|
| 2165272 | 6/1973 | France . | |
| 483684 | 7/1970 | Switzerland | 434/373 |

*Primary Examiner*—William H. Grieb
*Attorney, Agent, or Firm*—Cohen, Pontani & Lieberman

[57] ABSTRACT

A device for the visual presentation of visually combinable objects which are reproduced on two separate boards which are capable of guided movement relative to each other. One board has an image of a main object with an aperture at a desired location, such that a second object shown on the second board may be viewed through the aperture. For example, the main board may contain a picture of an automobile with apertures where the wheel hubs are located. The second board may contain an assortment of wheel hubs. By manipulating the guide in various directions, different wheel hubs can selectively be made to appear in the aperture on the main board, thereby showing the automobile with different wheel hubs for comparison purposes.

5 Claims, 10 Drawing Sheets

10
12
22
24
18
16
b
14
18
20
a 26
28
b
30
a

DEVICE FOR THE PRESENTATION OF OBJECTS

BACKGROUND AND SUMMARY OF THE INVENTION

The invention relates to a device for the visual presentation of objects which can be combined with each other, it having a picture board for the main object and an auxiliary board for the object to be associated therewith.

Upon the purchase of an automobile, the customer frequently has to choose among different rims which are illustrated by the manufacturer in a separate prospectus. It is not easy in this connection for the buyer of the automobile to picture the rims in question on the automobile selected by him.

The object of the invention is to make available a device of the type described above which makes it possible with simple means to produce a complete picture of the main object together with the object chosen for it—in the above example, the automobile together with the desired rims—in order to be able to quickly check the decision made and compare it with alternatives.

This object is achieved in accordance with the invention in the manner that the picture board has a corresponding recess at the position in which the object to be associated will lie, that the picture board is placed over the auxiliary board and that picture board and auxiliary board can be moved relative to each other.

A guide is preferably provided for the relative movement between picture board and auxiliary board.

The guide can in this connection be developed as slide guide Another possibility consists in developing the guide as fold-over mechanism on which several auxiliary boards are articulated.

Such a device would constitute a sales tool, in particular, for a car dealer, which would allow the latter to quickly show a customer several combinations of the automobile selected by him with various types of rims. Other applications are conceivable in the construction industry, for instance, combining the facade of a house with several types of doors.

BRIEF DESCRIPTION OF THE DRAWINGS

Further features and advantages of the invention result from the claims and from the following description of embodiments which have been shown in the drawing.

In the drawing.

DETAILED DESCRIPTION OF THE PREFERRED EMBODIMENTS

Figure 1:
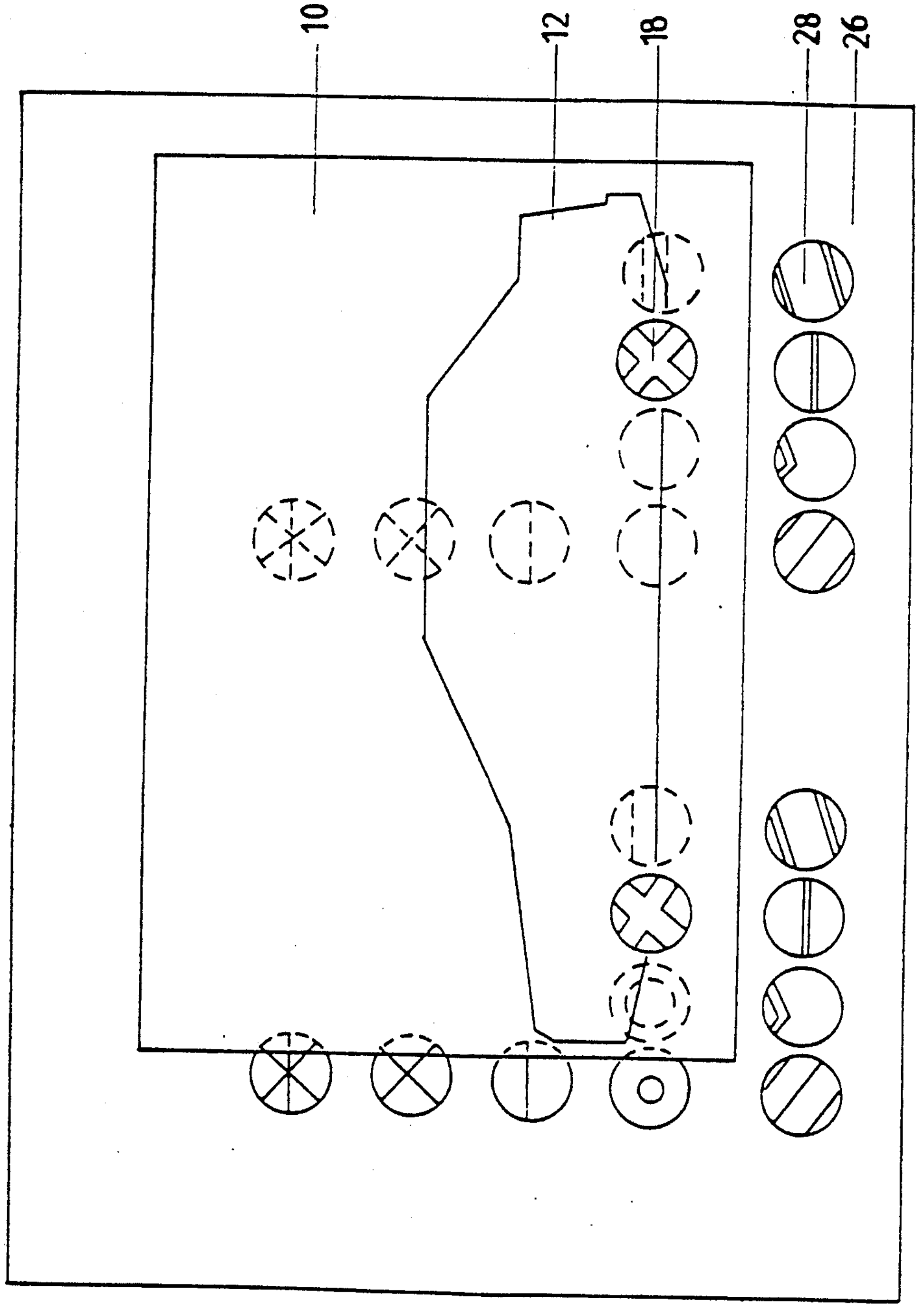
FIG. 1 shows a view of the simplest embodiment of a device according to the invention.

FIG. 1 shows the simplest embodiment of the invention with an automobile 12 being shown in side view on a picture board 10. Round recesses 18 have been punched out in the region of the two rims for front wheel and rear wheel. The picture board 10 has been placed on an auxiliary board 26 on which several pairs of different types of rims 28 are shown. They may be arranged both in horizontal and in vertical alignment. What is important is merely that the distance between the centers of two rims 28 of a pair of rims corresponds to the distance between the centers of the two recesses 18 on the picture board 10.

The picture board 10 can now be placed on the auxiliary board 26 in such a manner that in each case one pair of rims appears in the recesses 18. By sliding the picture board 10 over the auxiliary board 26, different pairs of rims can be shown in combination with the automobile 12 illustrated.

Figure 2:
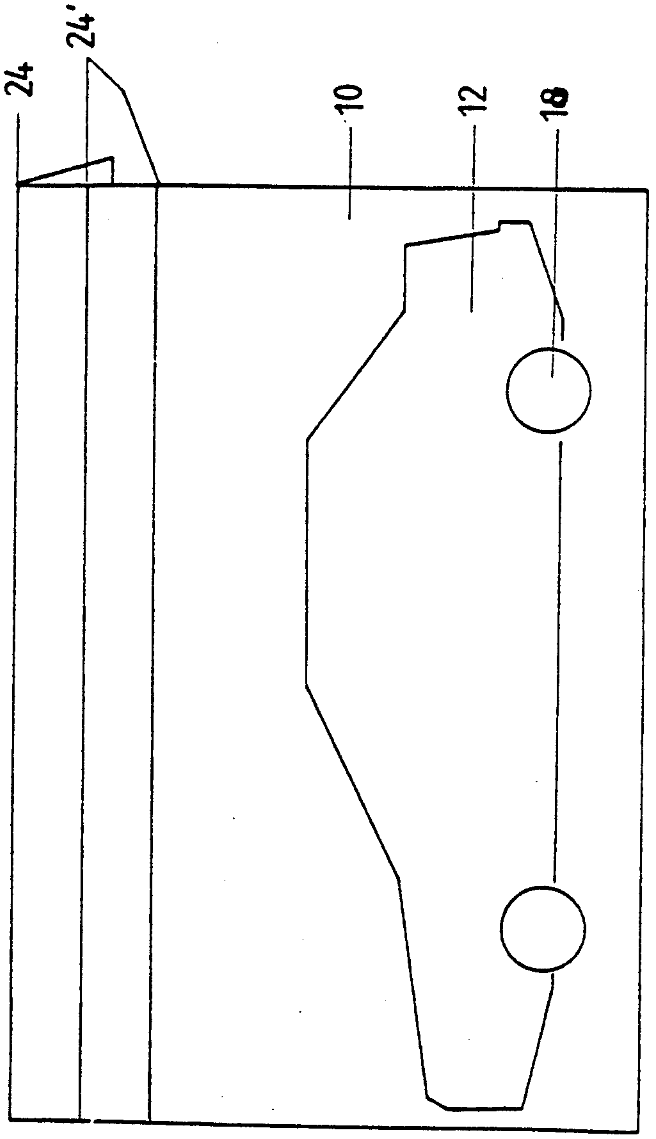
FIG. 2 shows a view of a modified embodiment of the picture board.

The embodiment shown in FIG. 2 is an embodiment of the picture board 10 which is improved as compared to FIG. 1 and which is used together with the auxiliary board 26 of FIG. 1. The picture board 10 has pre-folded bend lines 24′ which extend parallel to its upper edge, the distance between them corresponding to the distance between two rows of rims shown one above the other on the auxiliary board 26. The upper part of the picture board 10 can be bent off in rearward direction on these pre-folded bend lines 24′ so that a guide 24 is produced by means of which the picture board 10 can be displaced in longitudinal direction on the upper edge of the auxiliary board 26 arranged below it. In this way, different pairs of rims of a row of rims can be made visible in succession. If one wishes to get to the row of rims arranged above or below it, it is merely necessary to fold over another bend line 24′ in order to produce the corresponding guide 24.

Figure 3:
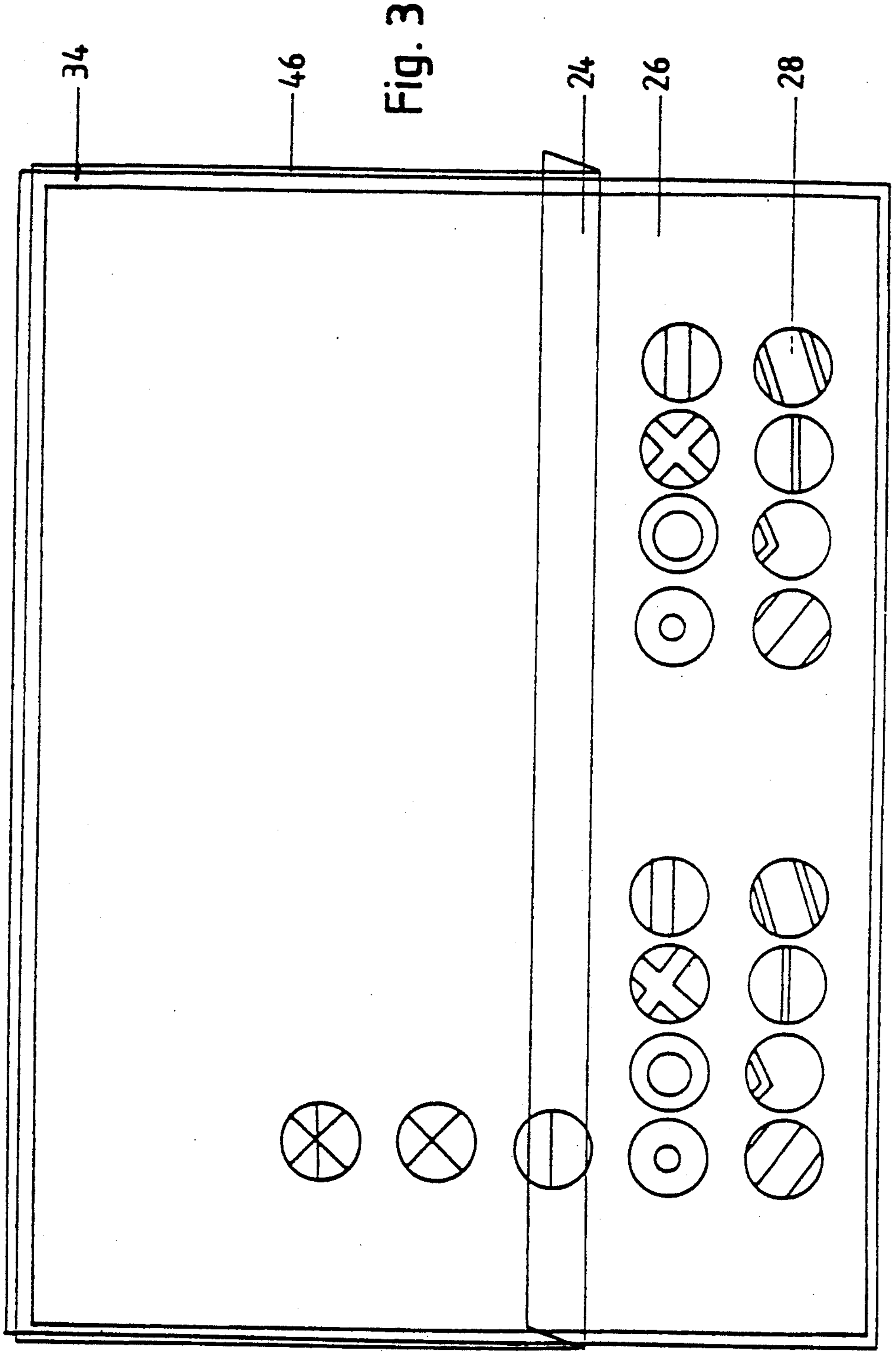
FIG. 3 shows a front view of another embodiment.
Figure 4:
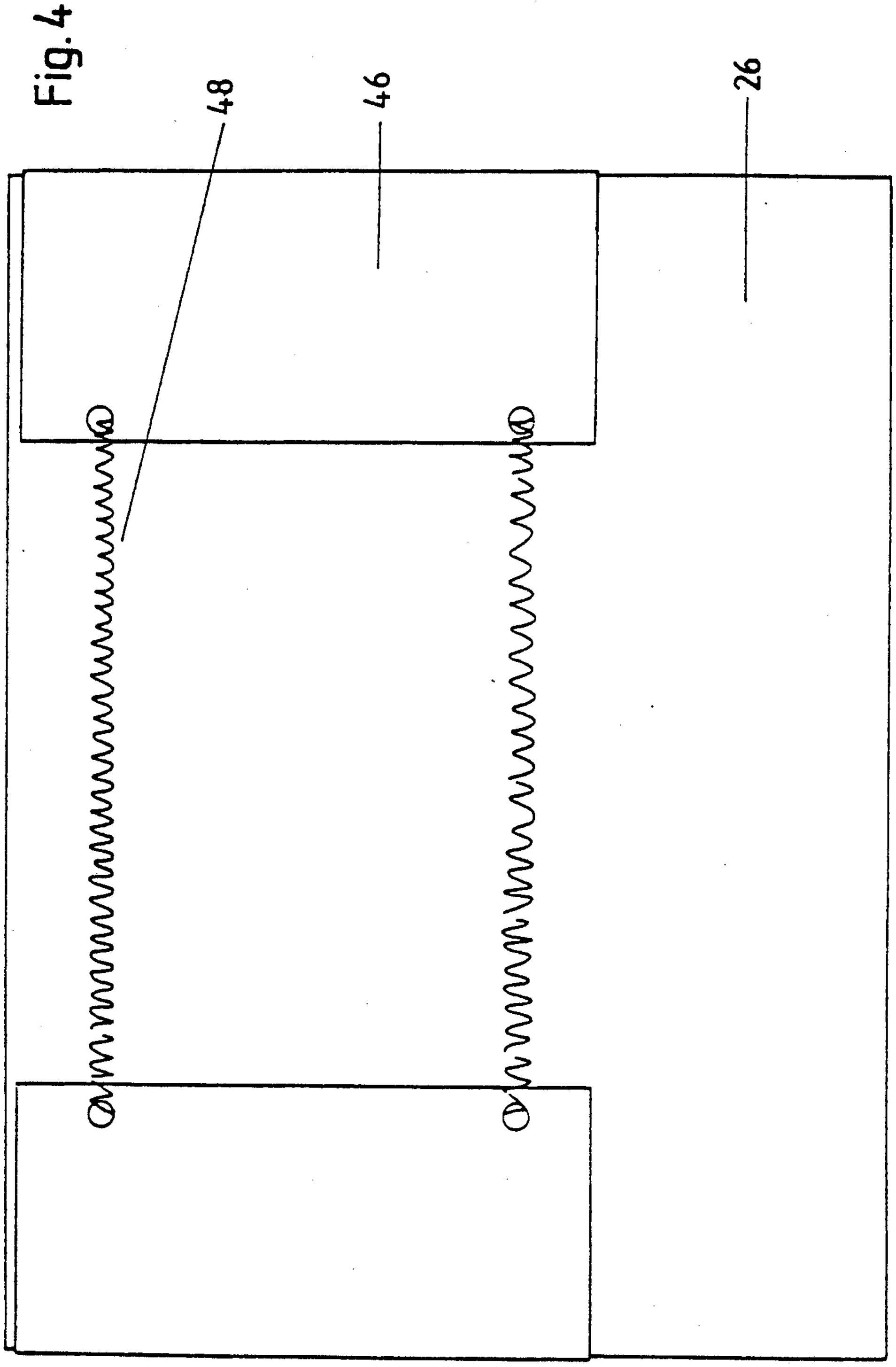
FIG. 4 shows a rear view of the device shown in FIG. 3.

An auxiliary board 26 is used also in the embodiment of FIGS. 3 and 4, said board showing various types of rims 28 above and below each other. This auxiliary board 26 is placed on a support board 34. The support board 34 is gripped around by a strip 46 of a transparent material, for instance plastic, which, in accordance with FIG. 4, is held together on its two bent-over ends by two elastic bands 48. The lower edge of the strip 46 is bent upward in the region of its front side and in this way forms the guide 24 on which a picture board 10 in accordance with FIG. 1 can be placed. The picture board 10 can be displaced on this guide 24 in order to make several types of rims 28 visible on the automobile 12. The strip 46 can also be displaced on the support board 34 in a direction at right angles to said direction of displacement in order to make the rows of rims 28 lying above or below also visible in the recesses 18 of the picture board 10.

The auxiliary board 26 can easily be replaced by another auxiliary board which shows additional types of rims. The support board 34 can be dispensed with if only one auxiliary board 26 is to be used; in this case the strip 46 with the guide 24 grips directly around the auxiliary board 26 for which purpose the latter should be made suitably stiff.

Figure 5:
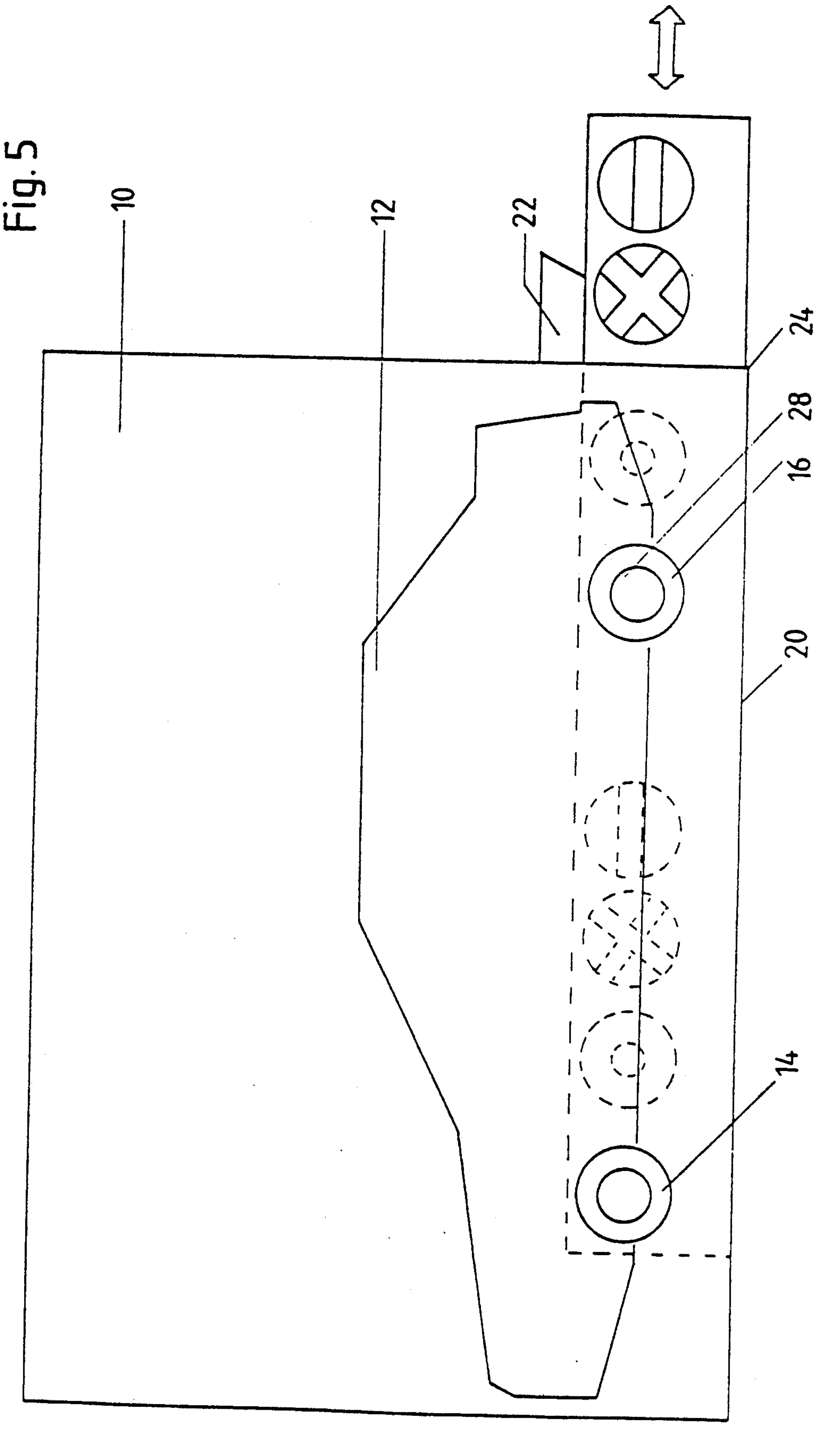
FIG. 5 is a view of a further variant.
Figure 6:
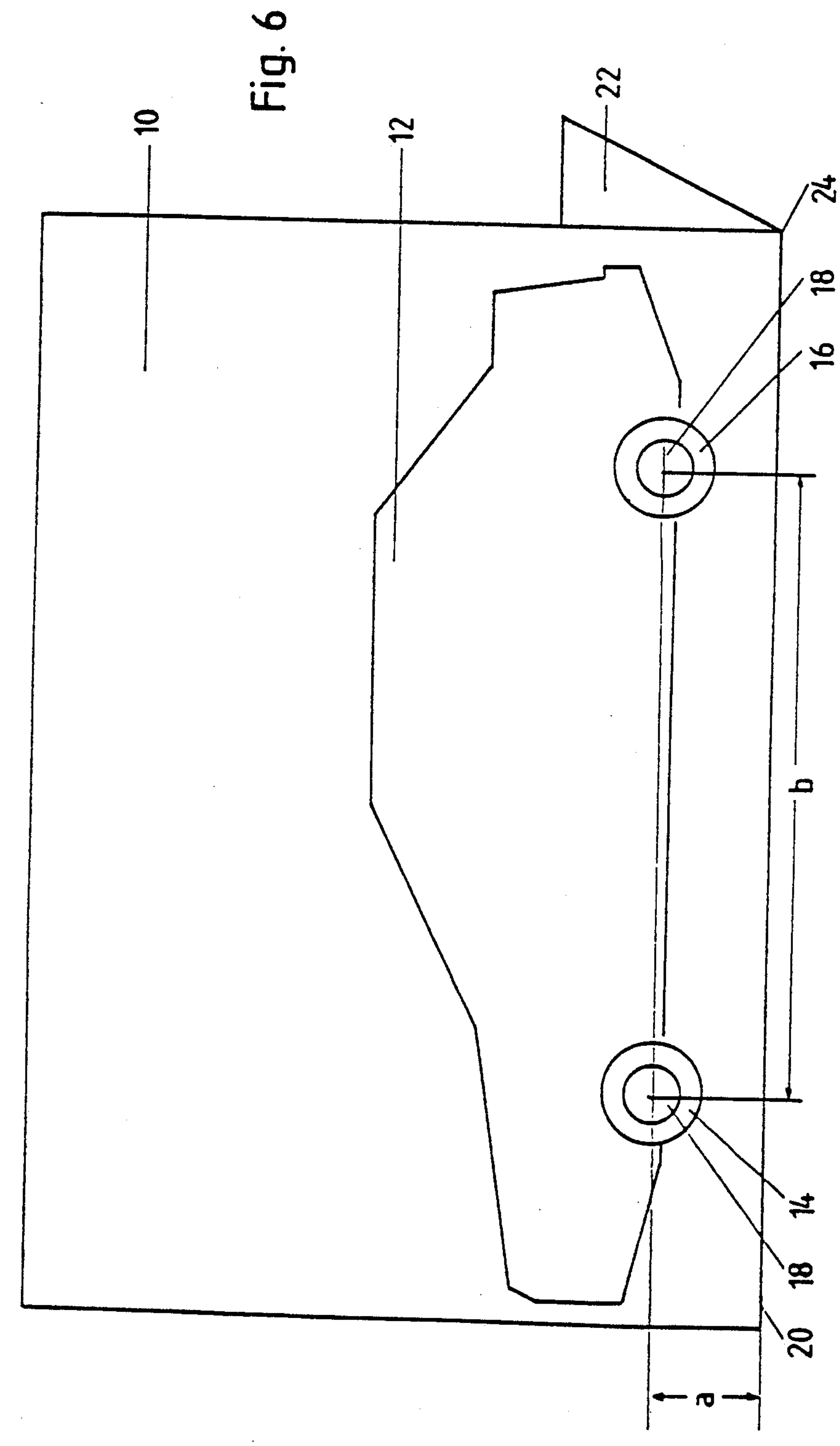
FIG. 6 is a view of the picture board shown in FIG. 5.
Figure 7:
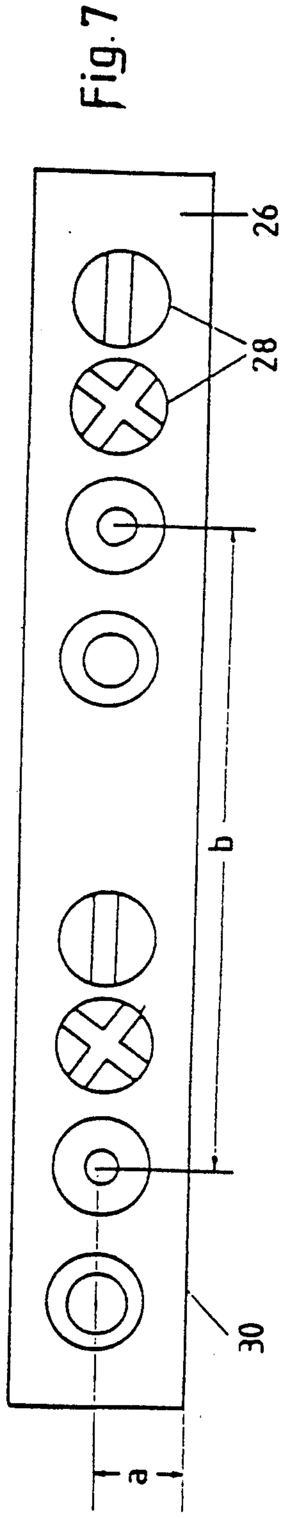
FIG. 7 is a view of the auxiliary board used in FIG. 5.

In the embodiment of FIGS. 5 to 7 there is also shown a picture board 10 displaying an automobile 12 in side view. As can be noted in particular from FIG. 6, round recesses 18 are punched out in the region of the two rims of the front wheel 14 and the rear wheel 16 shown, the center of said recesses having a distance a from the bottom edge 20 of the picture board 10. The lower part 22 of the picture board 10 is bent off toward the rear at the bottom edge 20.

The bent-off part 22 forms the guide 24 for a strip-shaped auxiliary board 26 which is shown in greater detail in FIG. 7. Several pairs of different types of rims 28 are shown on the auxiliary board 26, the centers of said rims also having the distance a from the bottom edge 30 of the auxiliary board 26. Also in this case, the distance b between the centers of two rims or a pair of rims corresponds to the distance b between the centers of the two recesses 18 in the picture board 10.

If the auxiliary board 26 is inserted in accordance with FIG. 5 into the guide 24 then each pair of rims can, by longitudinal displacement of the auxiliary board 26 relative to the picture board 10 be rapidly brought into alignment with the two recesses 18. In this way, any desired combination of the automobile 12 shown with the various types of rims 28 can be made visible.

Figures 8, 9:
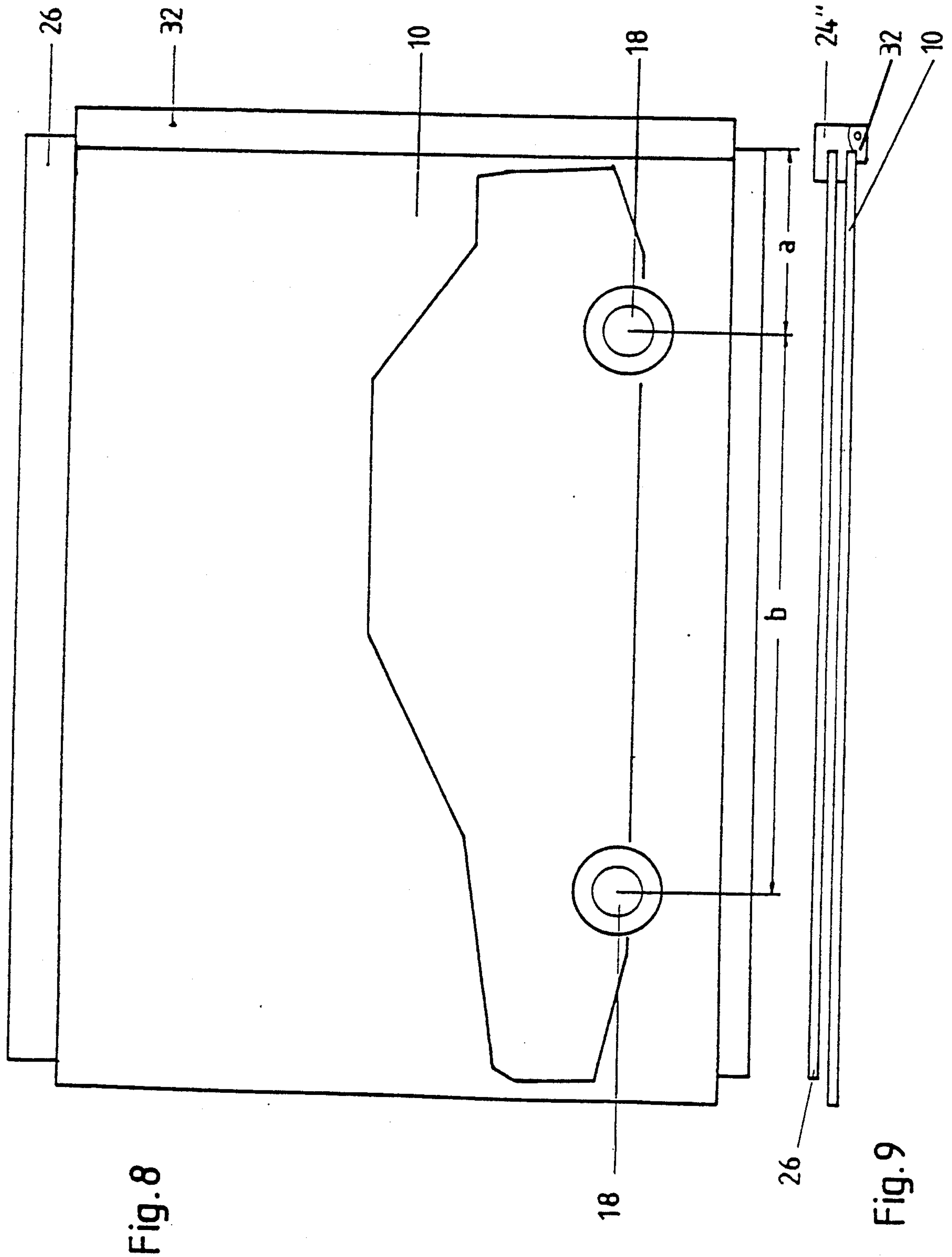
FIG. 8 is a view of another embodiment.
FIG. 9 is a top view of the device shown in FIG. 8.
Figure 10:
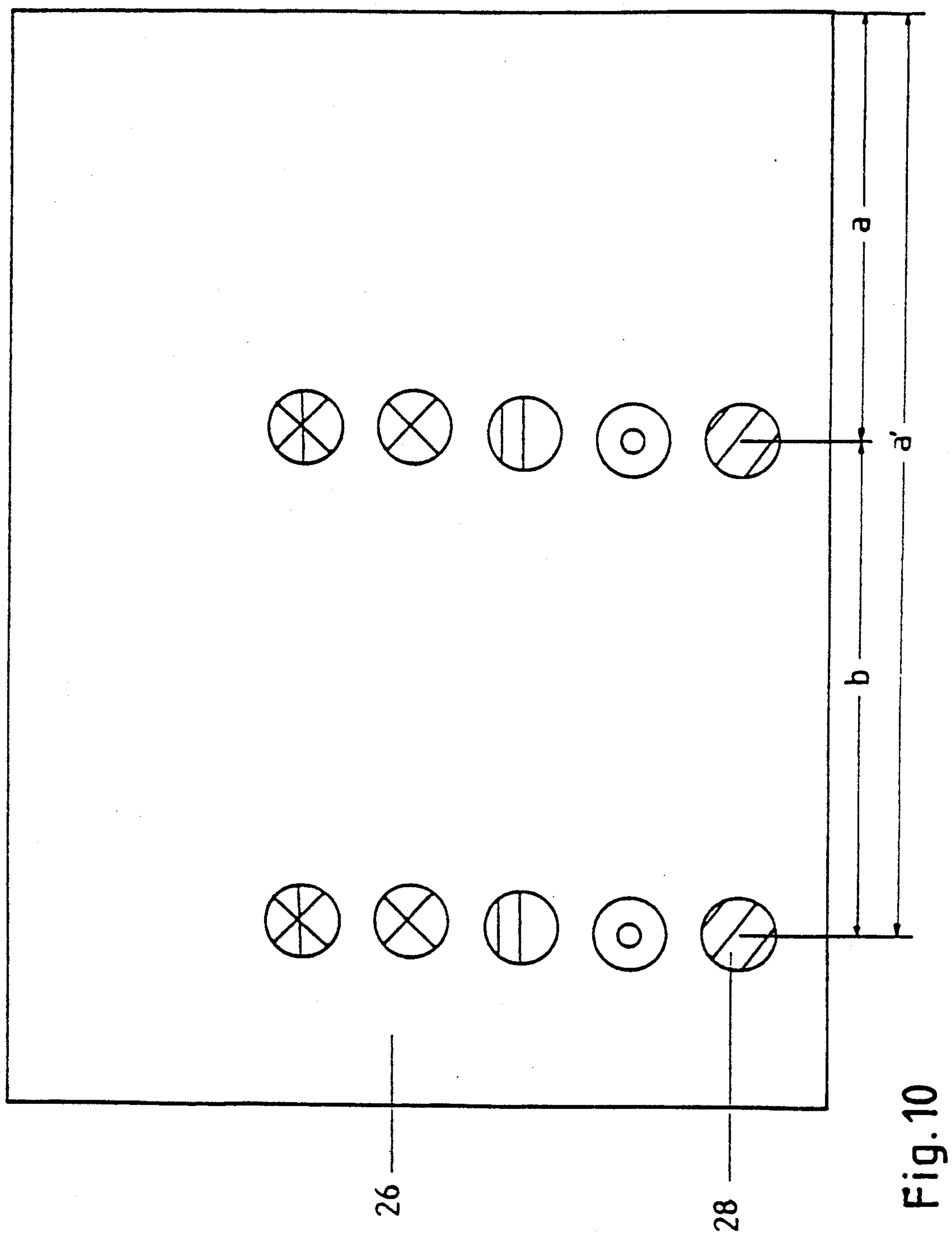
FIG. 10 shows the auxiliary board used in FIGS. 8 and 9.

In the embodiment of FIGS. 8 to 10, a U-shaped guide-rail 24'' is provided as guide which is fastened on a lateral edge of the picture board 10. For this purpose, the guide-rail 24'' has a clamping strip 32 which is articulated on the guide-rail 24'' in hinge-like manner and is pressed by a spring (not shown) into its clamping position holding the picture board 10.

In the U-shaped guide-rail 24'', an auxiliary board 26 can be displaced on which the individual types of rims 28 are illustrated one above the other, in accordance with FIG. 10. The distance b between two rims of a pair of rims corresponds also in this case to the distance b between two recesses 18 of the picture board 10. Furthermore the distance a of a vertical row of rims (or a' of the other vertical row of rims) from the edge of the auxiliary board 26 applied against the guide is equal to the corresponding distance a or a' respectively of the recess 18 in the picture board 10, in which connection a'=a+b.

Figures 11, 12:
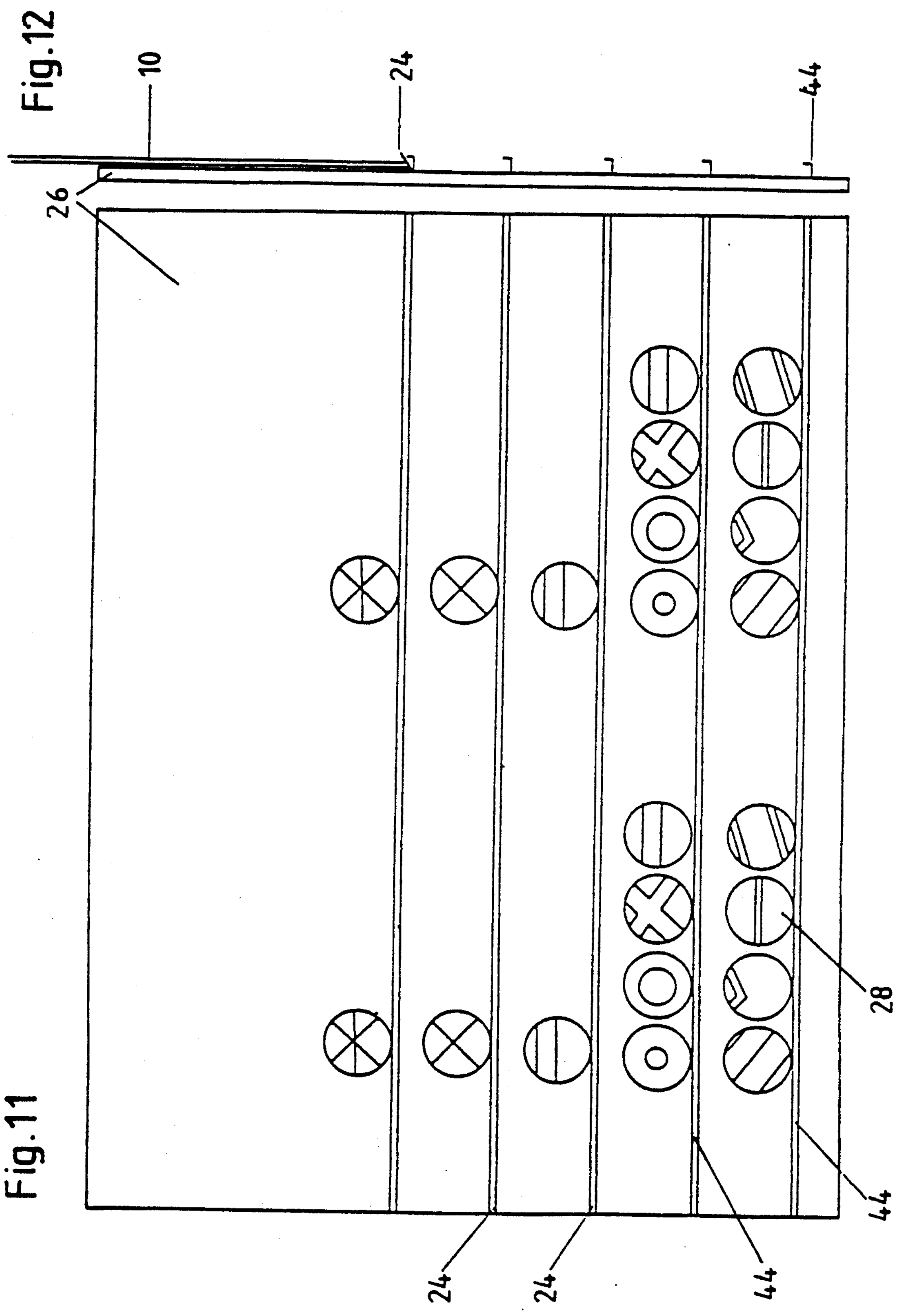
FIG. 11 is a view of another embodiment.
FIG. 12 is a side view of the device according to FIG. 11.

In the variant of FIGS. 11 and 12, several guides 24 are arranged on an auxiliary board 26 parallel to each other and one above the other, each guide being developed as slide guide with a guide-rail 44. The picture board 10 can be inserted in each guide in order thereupon to displace it relative to the rims 28 which are shown on the auxiliary board 26.

Figure 13:
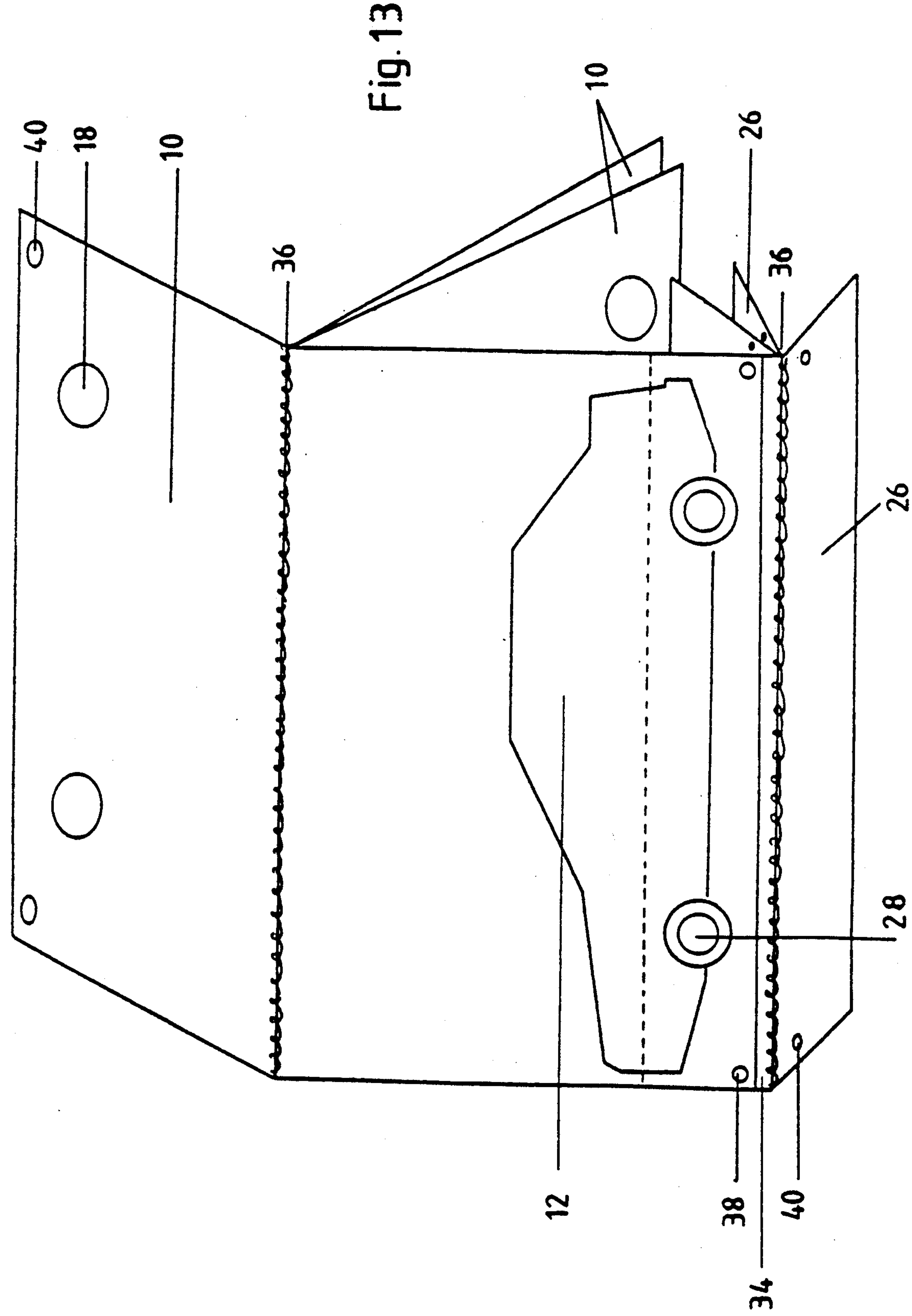
FIG. 13 is a view of another variant of the device.

As shown in FIG. 13, the device in accordance with the invention can also be developed in such a manner that several picture boards 10 are articulated on the upper edge of a support board 34 by a folding mechanism 36, the boards also having the recesses 18 already explained above in the region of the rims. Several auxiliary boards 26 are also articulated on the bottom edge of the support board 34 by means of a folding mechanism 36, each auxiliary board showing a pair of rims 28.

In this variant, the corresponding type of rims can rapidly be folded over and added to various automobiles which, for instance, have different colors. In order to assure in this connection a precise alignment between automobile 12 and rims 28, positioning pins 38 protrude from the support board 34 which pins, in the folded-in condition, engage into corresponding holes 40 both of the picture board 10 and of the auxiliary board 26.

It should be understood that the preferred embodiments and examples described previously are for illustrative purposes only and are not to be construed as limiting in scope of the present invention, which is properly delineated in the following claims.

What is claimed is:

1. A device for the visual presentation of visually combinable objects, said objects being a main object and associated objects, shown on separated boards capable of relative movement in planes parallel to each other; said boards being a main picture board presenting the visual image of said main object and an auxiliary board presenting the visual image of said associated objects, said main picture board having an aperture at the position on the main object where an associated object is to be located; and a guide movably mounted on one of said boards and engageable with the other of said boards, for permitting concomitant movement of said other board with said guide in a given direction relative to said one board, said guide permitting the other of said boards to move in another direction relative to said guide whereby to permit such movement relative to said one board, whereby to selectively display an associated object with said main object by selectively registering said aperture in said main object board with an associated object on said auxiliary board.

2. A device according to claim 1, wherein said guide is movably mounted on said auxiliary board.

3. A device according to claim 2, wherein said guide is slidably mounted on said auxiliary board and permits slidable movement of said main board.

4. A device according to claim 2, wherein said guide is transparent at least at those location where said aperture on the main picture board can register with said guide.

5. A device according to claim 2, wherein said given direction and said other direction are at right angles to each other.

* * * * *